US009616991B2

(12) United States Patent
Wirasnik

(10) Patent No.: US 9,616,991 B2
(45) Date of Patent: Apr. 11, 2017

(54) MECHANICALLY SELF-REGULATED PROPELLER

(71) Applicant: Peter Daniel Wirasnik, Glen Gardner, NJ (US)

(72) Inventor: Peter Daniel Wirasnik, Glen Gardner, NJ (US)

( * ) Notice: Subject to any disclaimer, the term of this patent is extended or adjusted under 35 U.S.C. 154(b) by 0 days.

(21) Appl. No.: 15/143,852

(22) Filed: May 2, 2016

(65) Prior Publication Data

US 2016/0318600 A1    Nov. 3, 2016

Related U.S. Application Data

(60) Provisional application No. 62/155,891, filed on May 1, 2015.

(51) Int. Cl.
*B64C 3/56*      (2006.01)
*B64C 11/28*     (2006.01)
*B64C 27/50*     (2006.01)
*B64C 11/04*     (2006.01)
*B64C 11/00*     (2006.01)
*B64C 31/024*    (2006.01)
*B64C 1/00*      (2006.01)

(52) U.S. Cl.
CPC ............ *B64C 11/28* (2013.01); *B64C 11/002* (2013.01); *B64C 11/04* (2013.01); *B64C 31/024* (2013.01); *B64C 2001/0045* (2013.01)

(58) Field of Classification Search
CPC ..... B64C 3/56; B64C 11/28; B64C 2201/102; B64C 27/50

USPC .......................................... 415/142; 416/142
See application file for complete search history.

(56) References Cited

U.S. PATENT DOCUMENTS

| | | | |
|---|---|---|---|
| 730,359 A | | 6/1903 | Fladby |
| 1,496,723 A | * | 6/1924 | Miller ..................... B64C 11/28 416/124 |
| 2,198,475 A | | 5/1939 | Dorner |
| 2,452,923 A | | 11/1946 | Graff |
| 2,509,367 A | * | 5/1950 | Prewitt ................... B64C 27/30 416/26 |
| 2,568,214 A | * | 9/1951 | Bennett ................... B64C 27/51 416/140 |
| 2,896,926 A | | 7/1959 | Chapman |

(Continued)

FOREIGN PATENT DOCUMENTS

GB    2504176    1/2014
WO    2008146947  12/2008

*Primary Examiner* — Sean J Younger
(74) *Attorney, Agent, or Firm* — Gearhart Law LLC

(57) ABSTRACT

Generally, a mechanically self-regulating propeller is described which may have a central hub unit disposed around a shaft member, at least two blades coupled to the central hub unit, at least one timing hub coupled to each of the at least two blades, and a hydraulic unit coupled to the at least one timing hub. The at least one timing hub is slidably engaged to the shaft member. When not in use the blades lay substantially parallel to the central hub unit. When the central hub unit is rotated the blades begin to open or fan out to a position that is substantially perpendicular to the central hub unit. The propeller may be used any number of implementations including vehicles, generators, and any other mechanism requiring a propeller or similarly structured device.

15 Claims, 13 Drawing Sheets

(56) References Cited

U.S. PATENT DOCUMENTS

| | | | |
|---|---|---|---|
| 3,528,630 A * | 9/1970 | Ferris | B64C 27/50 |
| | | | 244/12.3 |
| 4,242,049 A | 12/1980 | Forsling et al. | |
| 4,310,285 A | 1/1982 | Blanchard | |
| 4,624,624 A | 11/1986 | Yum | |
| 5,104,291 A | 4/1992 | Morrison | |
| 6,065,933 A * | 5/2000 | Secord | B63H 1/22 |
| | | | 416/142 |
| 6,260,797 B1 | 7/2001 | Palmer | |
| 6,308,632 B1 | 10/2001 | Shaffer | |
| 6,371,726 B1 | 4/2002 | Jonsson et al. | |
| 6,559,370 B1 | 5/2003 | Barker | |
| 7,674,034 B2 | 3/2010 | Kozlowski et al. | |
| 8,376,707 B2 | 2/2013 | McBride et al. | |
| 9,156,545 B1 * | 10/2015 | Fenny | B64C 27/50 |
| 9,327,831 B2 * | 5/2016 | Schank | B64C 27/50 |

\* cited by examiner

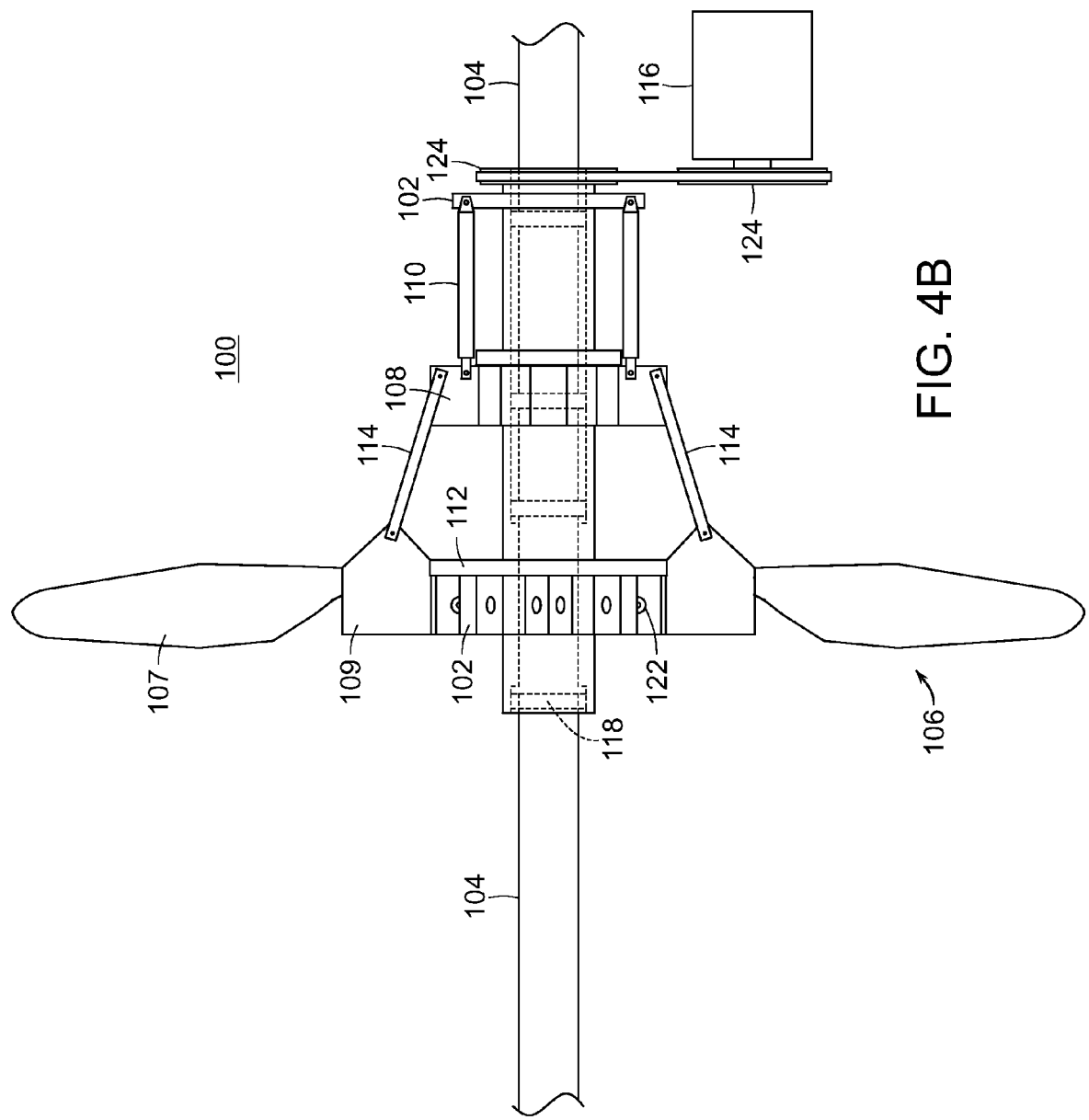

MECHANICALLY SELF-REGULATED PROPELLER

CLAIM OF PRIORITY

This application claims priority to U.S. Application Ser. No. 62/155,891 filed on May 1, 2015, the contents of which are herein fully incorporated by reference in its entirety.

FIELD OF THE EMBODIMENTS

The field of the present invention and its embodiments relate to a collapsible propeller that can be used in a number of different situations to provide main and/or auxiliary power to a vehicle, namely an aircraft. In particular, the collapsible propeller has a series of pivotally linked blades that can lie substantially parallel with the axis of rotation or be positioned up to a substantially perpendicular position with regard to the axis of rotation.

BACKGROUND OF THE EMBODIMENTS

Collapsible propellers, impellers, and turbines have been designed for various implementations including but not limited to both manned and unmanned aerial vehicles, medical devices, windmills, boats, mechanical stirrers, and the like. The form of such collapsible structures are as varied as their intended usages.

Collapsible propellers can provide a number of benefits over traditional propellers, such as the ability to be selectively operated thus saving on energy and/or fuel costs, reducing drag (when not in use), and directionally control an aircraft without having to supply further moving parts. However, with such systems come a number of problems.

Since the propeller must move from a "closed" or non-use position to an "open" or use position, there can be a number of concerns regarding proper balance and removing vibrations from the system. Thus, the expansion between the closed and open positioned must be correctly regulated or timed so that each propeller blade changes position in a uniform fashion. Further, if the propeller opens or closes at speed, the blades may violently open and/or close thereby causing damage to the aircraft, the propeller itself, or potentially human lives.

Additionally, it would be desirable to have a propeller that could function in the above described manner without requiring undue manipulation and/or calculations from a pilot of the particular aircraft in question. This means such a system would regulate itself and prevent any type of human error which is often the source of many operation based failures of various apparatus and systems.

Thus, there is a need for an apparatus, such as a collapsible propeller, that can both open and close without under human manipulation. Further such a propeller must be safe to be selectively operated at speed without damaging any surrounding materials. The present invention and its embodiments meet and exceed these objectives. In addition, such a collapsible propeller can be applied to any situation or parent device other than aircrafts as previously described herein.

Review of Related Technology:

U.S. Pat. No. 6,371,726 pertains to a foldable propeller for a ship having a hub for mounting on a drive shaft of the ship, and at least two skew-type blades, each of which is pivotally arranged in the hub for configuration between a first, essentially folded together position and a second, essentially unfolded position, wherein each blade presents a generator line. Each of the blades has a skew distribution such that the leading edge of the inner and outer radii, respectively, are located substantially forward and aft of the generator line of the blade. The mid-chord line of the propeller extends substantially forward and aft of the generator line of the blade. A foldable propeller with such blade geometry provides improved performance; in particular, ready unfolding, high reverse thrust and low noise and vibration.

U.S. Pat. No. 4,624,624 pertains to a collapsible vertical wind mill, which comprises four main wings arranged in a rhombic form having a pair of opposed corners fitted on a shaft and auxiliary wings each provided on each of the main wings. The upper one of the pair corners on the shaft is fitted via a bearing capable of movement along the shaft. The other pair of opposed corners of the rhombic structure each have a hinged structure capable of variation of the angle.

U.S. Pat. No. 2,896,926 pertains to devices for mixing or treating fluids or free flowing powders. The invention comprises a rod or other support carrying a plurality of radial or diverging arms or blades hinged or jointed to the rod or support, or to a part carried thereby, and adapted to be folded towards or against the rod or support for the purpose of allowing the device to be passed through a restrictive aperture.

U.S. Pat. No. 2,198,475 pertains to a collapsible propeller for airplanes or for glider having auxiliary motors. The propeller comprises a rotary shaft, a plurality of blades, and a pivotal mounting for the blades upon the shaft permitting the arrangement of the same substantially parallel to the axis of rotation or at substantially right angles to said axis.

U.S. Pat. No. 1,496,723 pertains to an emergency propeller for use by aircraft that comprises two sections pivotally supported on the propeller shaft inward off the main propeller, said section being normally arranged in a line with the shaft and therefore in closed position, means being provided for solely holding the propeller blades and means being also provided for throwing and retaining the blades in the wind or water.

International Application WO2008/146947 pertains to a windmill that rotates a generator to generate electricity via wind power. The windmill has a hydraulic cylinder having a foldable propeller, a hydraulic cylinder for widening the propeller, a propeller shaft, a propeller shaft post, a bearing, a propeller shaft post angle adjusting bracket, and a propeller shaft post angle adjusting bracket shaft.

Various devices are known in the art. However, their structure and means of operation are substantially different from the present disclosure. The other inventions fail to solve all the problems taught by the present disclosure. The present invention and its embodiments provide for a mechanically timed collapsible propeller that can be selectively operated. Further, the propeller can be used to steer a craft, reduce drag, and operate under virtually any desired condition. At least one embodiment of this invention is presented in the drawings below and will be described in more detail herein.

SUMMARY OF THE EMBODIMENTS

Generally, the present invention and its embodiments provide for a collapsible propeller that can be implemented in a variety of fashions. For example, the collapsible propeller can be used to prime a turbine engine generator, by forcing air through an enclosed area, such as the engine's air intake, thus assisting in starting the actual rotary mechanism contained therein, and collapsing afterwards to reduce inlet drag, eliminating the need for starting mechanisms external from the engine assembly. In another instance, the collapsible propeller may be disposed on an aircraft for selective usage such as with human powered crafts or as an emergency backup in the event of the failure of the main propelling mechanism.

The collapsible propeller generally has a central hub that can be mounted in a number of fashions, and in a preferred embodiment, to the tail boom of an airframe. The central hub may also be mounted elsewhere such as in "tractor" or "pusher" configurations. Inside the hub, there are any number of bearings enabling rotation of the hub. Around the central hub, there are preferably between two and eight blades that are allowed to pivot or hinge approximately 90° between a "closed" or non-use position and an "open" or use position. The exact number and configuration of blades can depend on the required specifications and design requirements.

A timing hub may be positioned rearward, or behind, the central hub once assembled. The timing hub slidable engages the central hub and more than one timing hub may be used. If more than one is used, then one timing hub may be positioned behind the central hub and another in front of the central hub. The timing hub is coupled to each of the blades by timing arms and further coupled to one or more hydraulic cylinders. The hydraulic cylinders are also coupled to the central hub.

A drive motor, such as an electric motor, internal combustion motor, or the like, is coupled to the central hub via a drive sprocket or gearing set up. The position of this set up may vary and may depend on the type of motor in use. The motor provides the energy which turns the sprockets thereby rotating the central hub causing the blades to fan out in an open configuration.

In one embodiment there is a mechanically self-regulating propeller comprising a central hub unit disposed around a shaft member; at least two blades coupled to the central hub unit; at least one timing hub coupled to each of the at least two blades, wherein the at least one timing hub is slidably engaged to the shaft member; and a fluid buffer unit coupled to the at least one timing hub.

In another embodiment there is a mechanically self-regulating propeller comprising a central hub unit coupled to a shaft member such that rotation of the shaft member causes rotation of the central hub unit; a lock plate coupled to one surface of the central hub unit; a plurality of blades hingeably coupled to the central hub unit, wherein each of the plurality of blades comprise a blade body and a blade arm; at least one timing hub coupled to each of the plurality of blades, wherein the at least one timing hub is slidably engaged to the shaft member, and wherein each of the plurality of blades is coupled to the at least one timing hub via at least one timing arm; and at least one fluid buffer unit coupled to the at least one timing hub.

In yet another embodiment there is a mechanically self-regulating propeller comprising a central hub unit coupled to a shaft member such that rotation of the shaft member causes rotation of the central hub unit; a circular lock plate coupled to one surface of the central hub unit; a plurality of blades hingeably coupled to the central hub unit, wherein each of the plurality of blades comprise a blade body and a blade arm, and wherein the plurality of blades are capable of being positioned in at least an open and a closed position; at least one timing hub coupled to each of the plurality of blades, wherein the at least one timing hub is slidably engaged to the shaft member, and wherein each of the plurality of blades is coupled to the at least one timing hub via at least one timing arm; and at least one fluid buffer unit coupled to the at least one timing hub.

In some embodiments, the collapsible propeller is capable of being automatically deployed, that is, deployed in response to a push button, switch, knob, or the like or may be manually deployed using a lever or other comparable means to engage or disengage the blades of the propeller.

In general, the present invention succeeds in conferring the following, and others not mentioned, benefits and objectives.

It is an object of the present invention to provide a collapsible propeller that can be employed on a human powered vehicle.

It is an object of the present invention to provide a collapsible propeller that can be used on an unmanned vehicle.

It is an object of the present invention to provide a collapsible propeller that can be used to prime a generator or other mechanical equipment.

It is an object of the present invention to provide a collapsible propeller to alleviate balance and vibration during opening and closing of the propeller.

It is an object of the present invention to provide a collapsible propeller to decrease drag experienced by a parent system employing the propeller.

It is an object of the present invention to provide a collapsible propeller that can be used to steer a vehicle.

It is an object of the present invention to provide a collapsible propeller that can change the horizontal and/or vertical speed of a vehicle.

It is an object of the present invention to provide a collapsible propeller that can recharge a battery system coupled to the propeller.

It is an object of the present invention to provide a collapsible propeller that limits or prevents damage to the parent system.

It is an object of the present invention to provide a collapsible propeller that can be automatically and manually engaged.

It is an object of the present invention to provide a collapsible propeller that can operate as an air brake.

It is an object of the present invention to provide a collapsible propeller that can operate with other collapsible or non-collapsible propellers.

BRIEF DESCRIPTION OF THE DRAWINGS

FIG. 4B is another side view of an embodiment of the present invention in an open position with a forward located timing hub.

DESCRIPTION OF THE PREFERRED EMBODIMENTS

Figure 1:
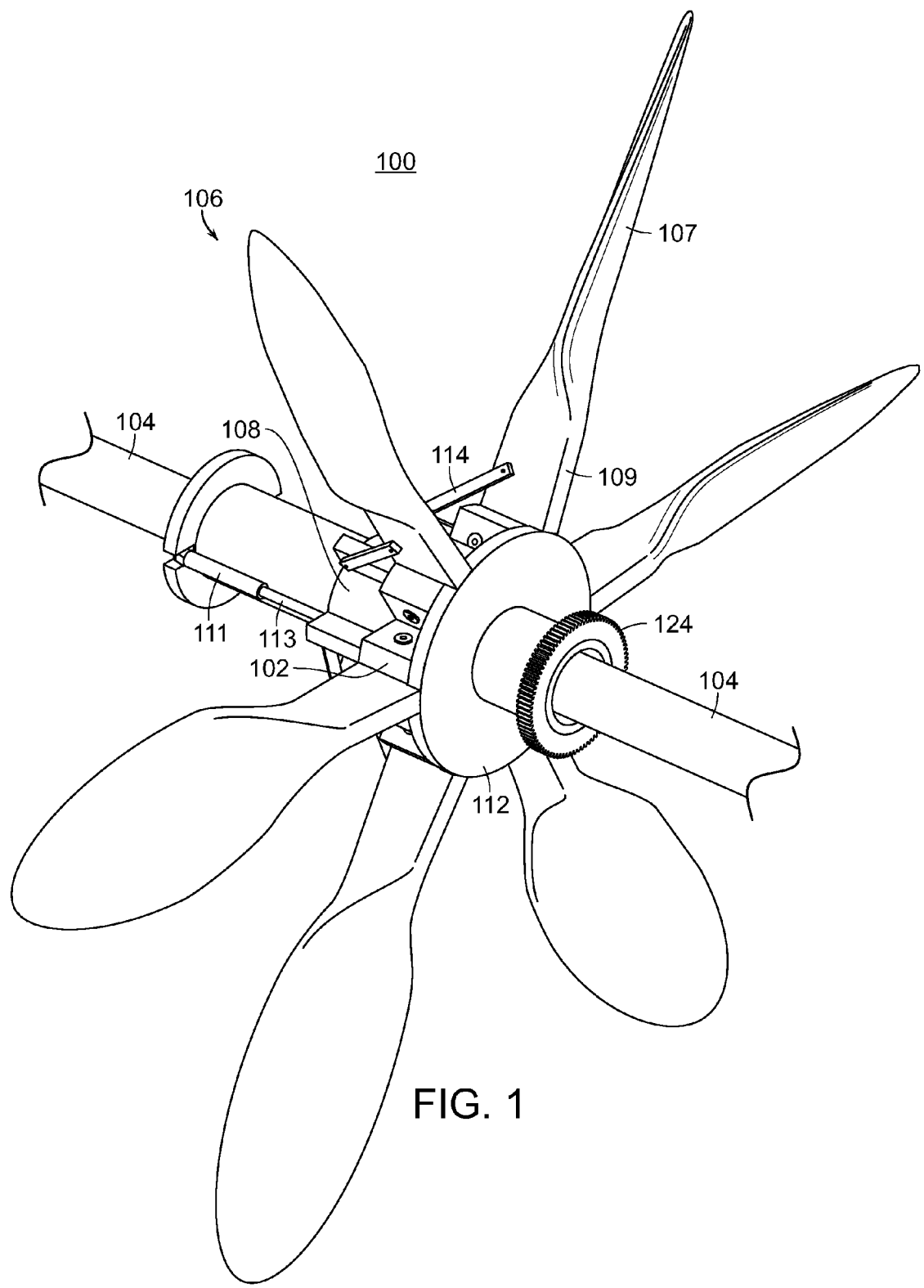
FIG. 1 is a perspective view of an embodiment of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Referring now to FIG. 1, there is a perspective view of the collapsible propeller 100. The collapsible propeller 100 is preferably mounted upon a shaft member 104 on which it may rotate freely or once a mechanism is applied to cause rotation of the propeller.

Generally, the collapsible propeller 100 has a central hub unit 102, blades 106, a timing hub 108, a lock plate 112, at least one fluid buffer unit 110, and a drive mechanism 124. The blades 106 may comprise a blade body 107 and a blade body 109. The timing hub 108 may have timing arms 114 that are coupled to the timing hub 108 and the blade arm 109. The fluid buffer unit 110 may have a first arm 111 and a second arm 113.

The central hub unit 102 is situated to be rotatably coupled to the shaft member 104. The central hub unit 102 has bearings 118 (see FIG. 2) which reside between the central hub unit 102 and the shaft member 104 to facilitate this rotative relationship. In at least one embodiment, the central hub unit 102 is designed to be mounted on a tail boom of an airframe. In other embodiments, the central hub unit 102 may be placed on supports or other structures capable of receiving the unit. On one face of the central hub unit 102, there is a lock plate 112 coupled thereto. The lock plate 112 serves to limit the movement of the blades 106 when the collapsible propeller 100 is in motion. A length of the central hub unit 102 extends from this main section and terminates in a second "hub" where the fluid buffer unit(s) 110 are coupled thereto.

Figure 2:
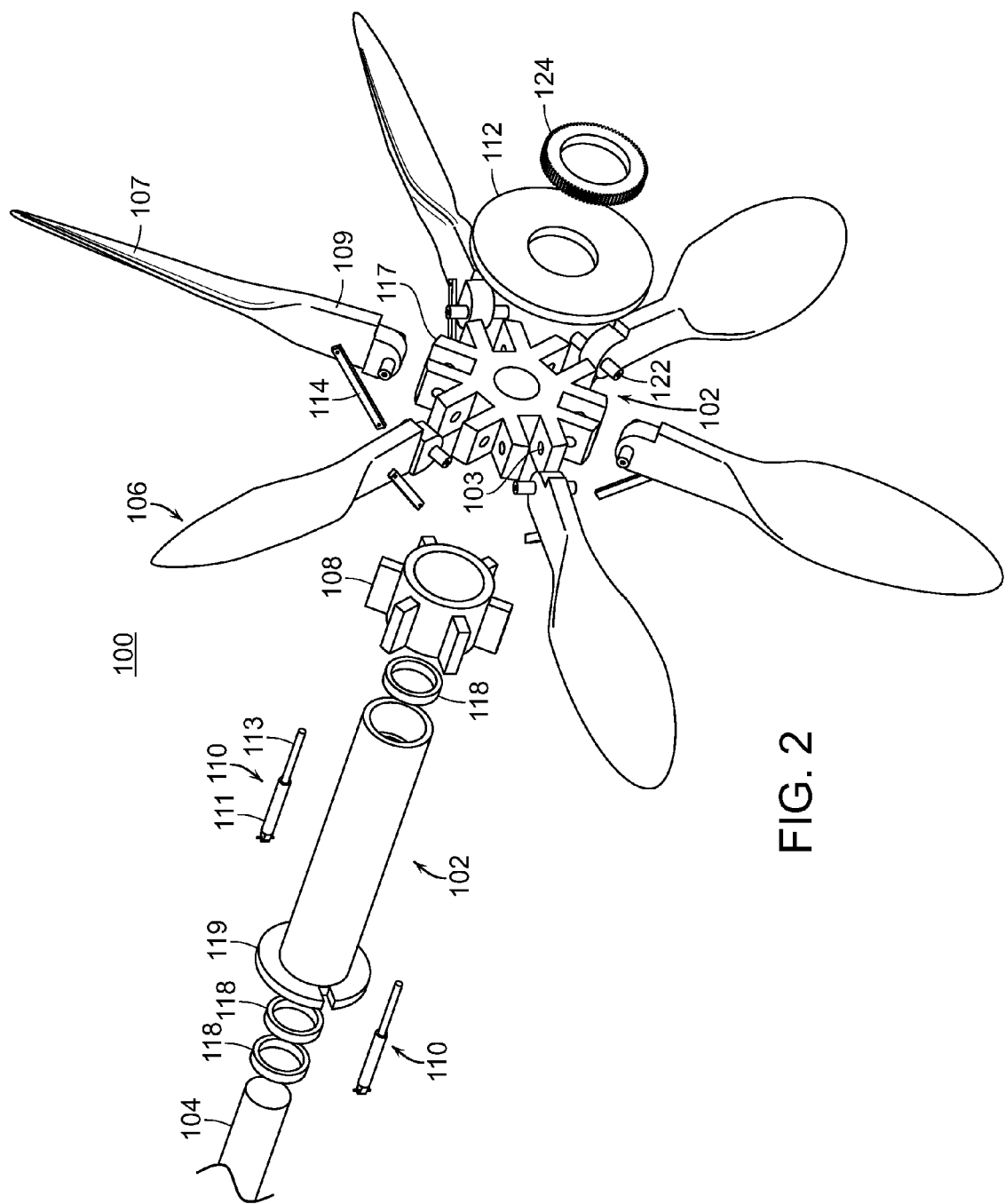
FIG. 2 is an exploded view of an embodiment of the present invention.

The central hub unit 102 further has at least two and preferably a plurality of receiving areas 103 (see FIG. 2). The receiving areas 103 are sections of the central hub unit 102 designed and shaped to receive the blades 106, namely the blade arms 109, therein. A coupling mechanism 122 capable of permitting rotational movement, respective to the shaft member 104, of the blades 106 is supplied to securely fasten the blades 106 to the central hub unit 102.

The timing hub 108 is mounted to the rear or behind the central hub unit 102 as shown. However, other embodiments (including those described below) may have alternative configurations with respect to this relationship. The timing hub 108 is preferably slidably coupled to the central hub unit 102. The timing hub 108 is coupled to each of the blades 106 via a timing arm 114. At least one timing arm 114 couples the timing hub 108 to each of the blades 106 and in some embodiments, multiple timing arms 114 are used per blade 106.

The timing hub 108 is further coupled to each of the at least one fluid buffer unit 110. The fluid buffer unit 110 preferably comprises a first arm 111 and a second arm 113. The second arm 113 is slidably engaged to the first arm 111, allowing the second arm 113 to compress or slide into a recess in the first arm 111. In some cases, the first arm 111 may be the sliding arm whereas the second arm 113 remains fixed and stationary. The fluid buffer unit(s) 110 preferably comprises a neutral hydraulic buffer cylinder that regulates the rate at which the timing hub 108 slides or moves along the central hub unit 102. This primarily serves to prevent the blades 106 from contacting one another between a resting phase and an in-use phase of the collapsible propeller 100. Not only does this prevent damage to the propeller itself but further limits potential damage to the apparatus to which the propeller is attached.

A drive mechanism 124 or drive sprocket may be coupled to the central hub unit 102 to provide power to the propeller from a power source such as a motor or other mechanical means. The drive mechanism 124 can be further located in a varying number of positions as needed. In some instances, multiple drive mechanisms 124 may be employed.

Referring now to FIG. 2, there is an exploded view of the collapsible propeller 100 demonstrating the interrelationship of the components of the propeller. Here, more of the physical structure of the collapsible propeller 100 is visible.

The timing hub 108 is shown as it would fit around the central hub unit 102. The timing hub 108 may further have wings or protrusions for coupling the timing arms 114 to the blade arms 109. Other suitable structures for the positioning and displacement of the timing arms 114 may also be used. The timing hub 108 is shown to be generally circular, however, other shapes may be applicable depending on the intended usage, shape of the shaft member 104, or shape of the central hub unit 102.

The central hub unit 102 may comprise at least a couple distinct areas and these areas may or may not be removable from one another. In some embodiments, the central hub unit 102 is a single piece to prevent breakage and reduce vibrations. The central hub unit 102 has a central hub 117 on one end and a backing 119 on the other end. Each may or may not be located on a physical end of the central hub unit 102 but simply reside at some point along the length of the central hub unit 102. The backing 119 provides a surface for the fluid buffer unit 110 to be coupled opposite the timing hub 108.

Further, the central hub 117 provides the surface and mechanisms for attachment or coupling of the blades 106 to the central hub unit 102. The central hub 117 has receiving areas 103 which receive the blades arms 109 to be coupled therein by a coupling mechanism 122. The number of receiving areas 103 may vary and may number between about two and about ten.

The bearings 118 are shown in their position between the shaft member 104 and the central hub unit 102. The bearings 118 may be any suitable bearing and may vary in number between about one and about ten, with there being preferably three bearing disposed along the shaft member 104.

The lock plate 112 rests against one surface of the central hub 117. The lock plate 112 may have a particular shape to interact with the blade arms 109 thereby preventing rotation of the blades 106 past a certain angle. In some embodiments, there may be a lip of other structure on the blade arms 109 to facilitate this interaction. In some embodiments, the lock plate 112 is removable enabling different sized plates to be used with each having specific characteristics and interactions (i.e. permitted blade angle) with the blades 106. The drive sprocket 124 is preferably disposed along the length of the shaft member 104.

Figure 3A:
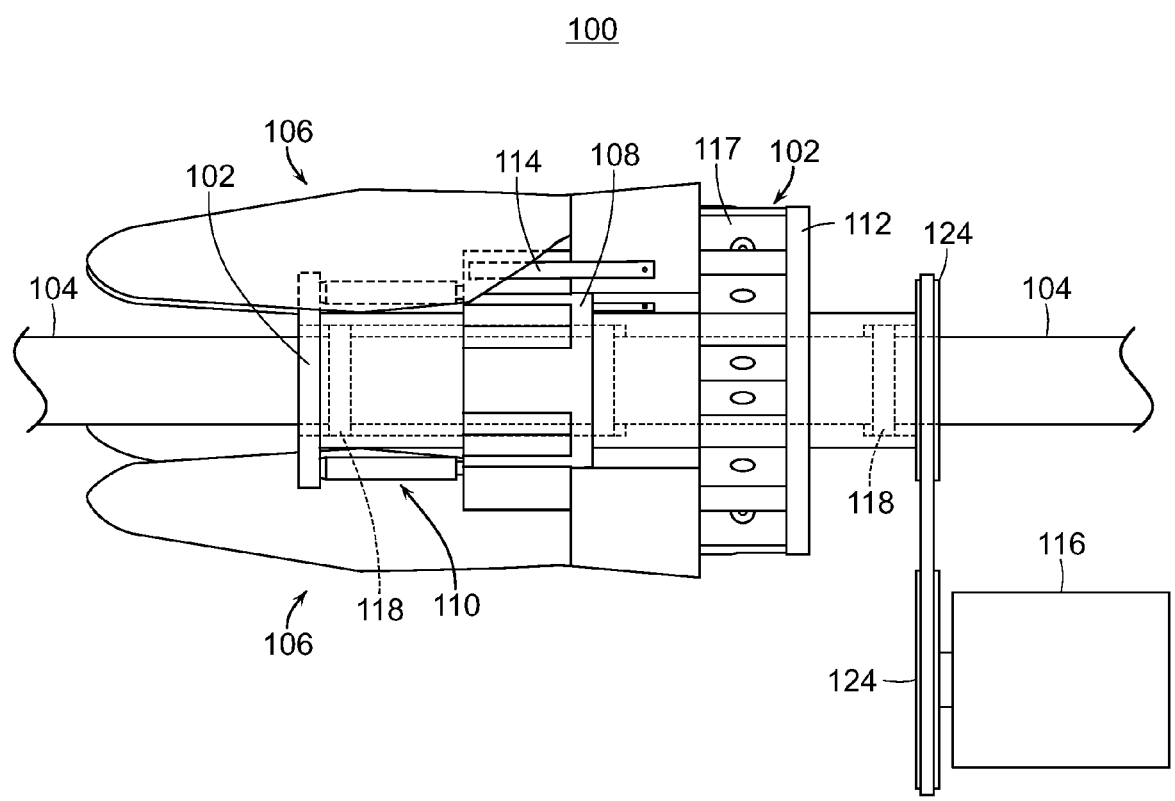
FIG. 3A is a side view of an embodiment of the present invention in a closed position with a rear located timing hub.
Figure 3B:
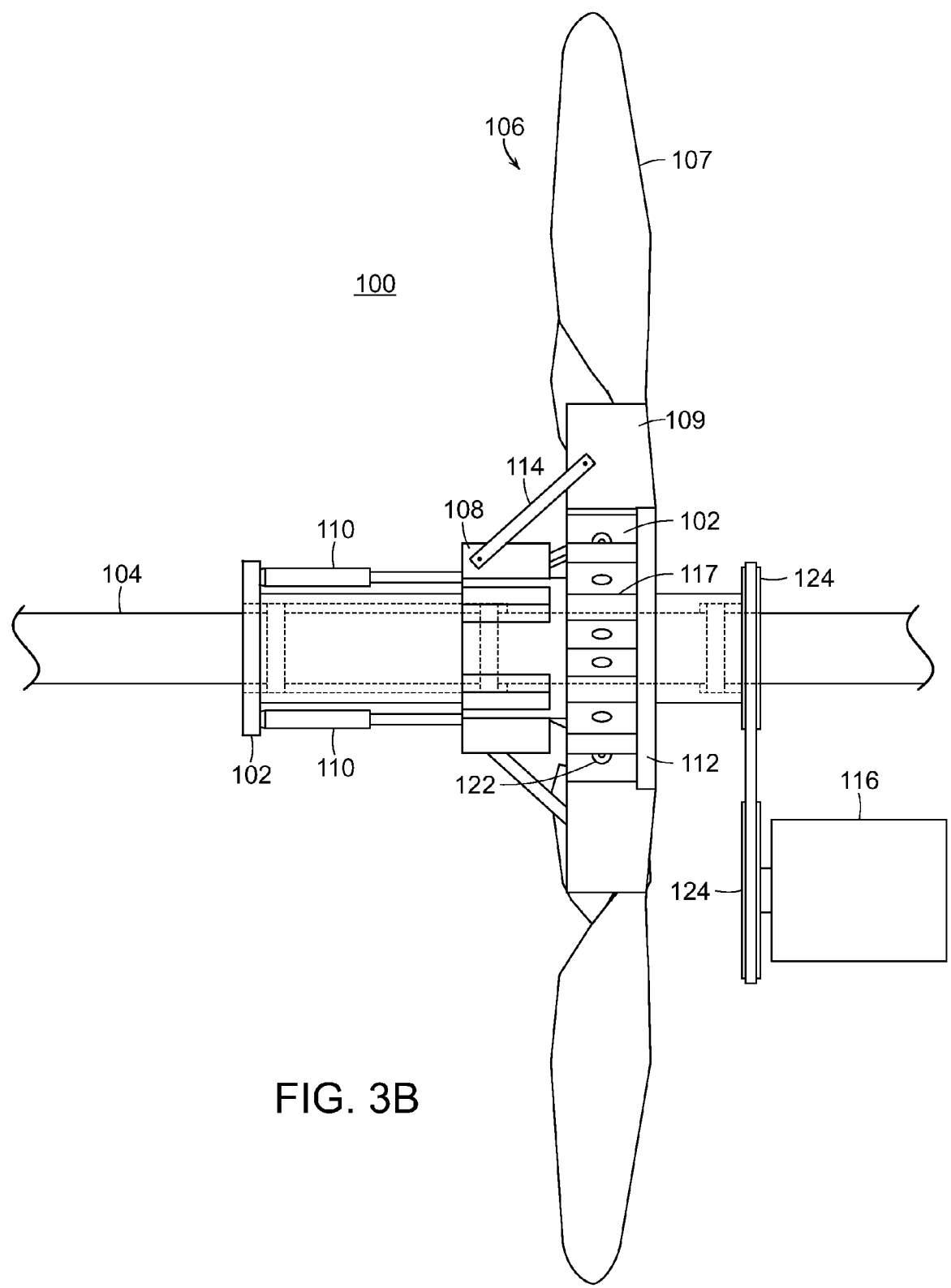
FIG. 3B is another side view of an embodiment of the present invention in an open position with a rear located timing hub.

In FIGS. 3A and 3B, there is a first embodiment of the present invention. Here, there is one timing hub 108 positioned behind the central hub 117. The blades 106 are shown in a closed or in operative configuration (FIG. 3A) and an open or operative configuration in (FIG. 3B). Shown are the shaft member 104, central hub unit 102, blades 106, fluid buffer unit 110, lock plate 112, timing arms 114, bearings 118, and drive mechanism 124. In the closed configuration, the motor 116 (or other power source) is not operative and does not cause rotation of the shaft member 104 by way of the drive mechanism 124. This position allows the collapsible propeller 100 to remain non-operative thereby saving on fuel and other energy expenditures when not needed, and further reducing drag when non-operational.

Preferably, once the motor 116 is engaged, the shaft member 104 begins to rotate causing rotation of the central hub unit 102. As rotation and centrifugal force increase the non-fixed end of the blades 106 begin to move towards the position shown in FIG. 3B. The movement of the blades 106 is controlled by the timing hub 108 and the fluid buffer units 110 which ensure proper control and a smooth transition between the closed and open positions. It is of note how the timing hub 108 moves along the central hub unit 102 and the blade arms 109 abut the lock plate 112 when in an open position.

Figure 4A:
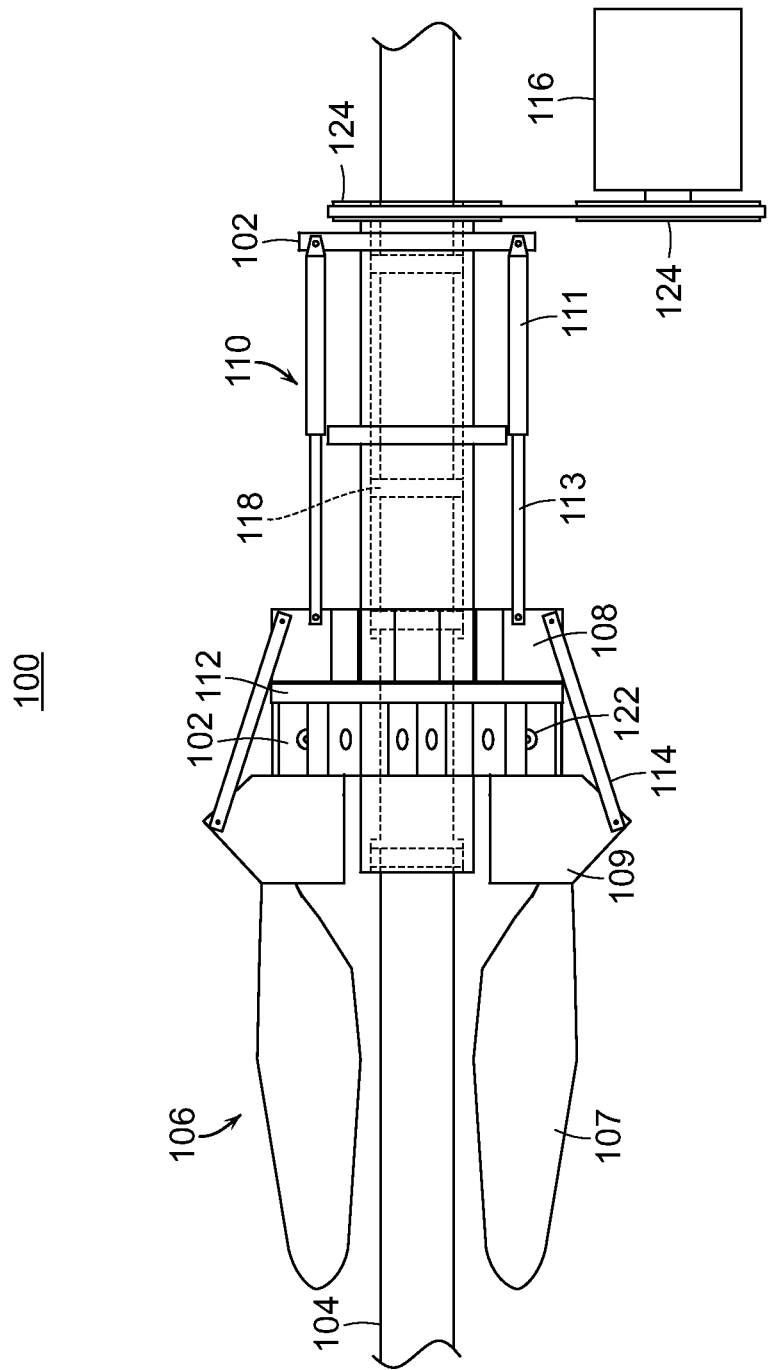
FIG. 4A is a side view of an embodiment of the present invention in a closed position with a forward located timing hub.

In FIGS. 4A and 4B, the timing hub 108 is located in front of the central hub unit 102. In FIG. 4A there is a collapsible propeller 100 of this embodiment in a closed position and in FIG. 4B the collapsible propeller 100 of this embodiment is in an open position. Shown are the shaft member 104, central hub unit 102, blades 106, blade body 107, blade arms 109, fluid buffer unit 110, first arm 111, second arm 113, lock plate 112, timing arms 114, bearings 118, drive mechanism 124, and motor 116.

In this embodiment, with the timing hub 108 located in front of the central hub unit 102, in the closed position, the timing hub 108 rests against the face of the lock plate 112. As power is applied, and the blades 106 open, the timing hub 108 moves forward down the shaft member 104, away from the central hub unit 102. In the fully open position, in some embodiments, the timing hub 108 contacts a stop plate, which may be part of the central hub unit 102, to prevent additional forward movement of the blades and/or the timing hub 108. Further, in this embodiment (as compared to the other embodiments described herein), the location of the fluid buffer units 110 must be changed, as shown, in order to connect the timing hub 108 to the central hub unit 102.

Overall, this embodiment has the potential to support the widest, most aggressively angled blades 106, as contact with the timing hub 108 and/or other components with the edge or face of the blades 106 is no longer an issue as with the other embodiments described herein.

Figure 5A:
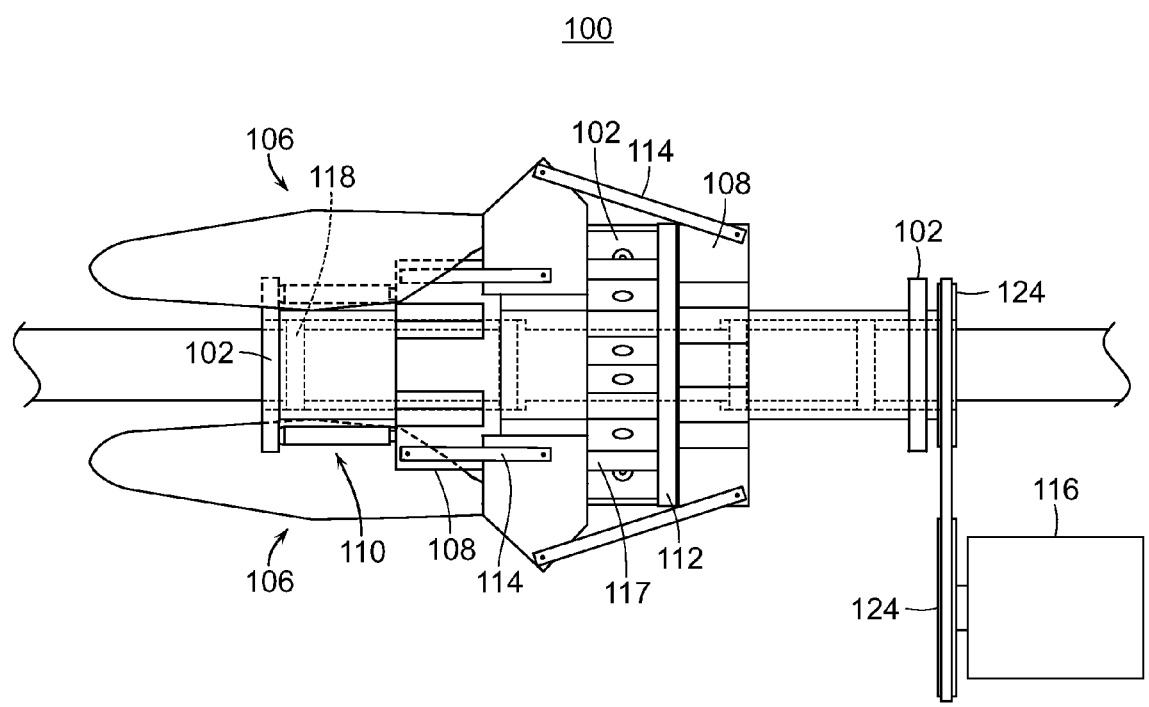
FIG. 5A is a side view of an embodiment of the present invention in a closed position with a dual timing hub.
Figure 5B:
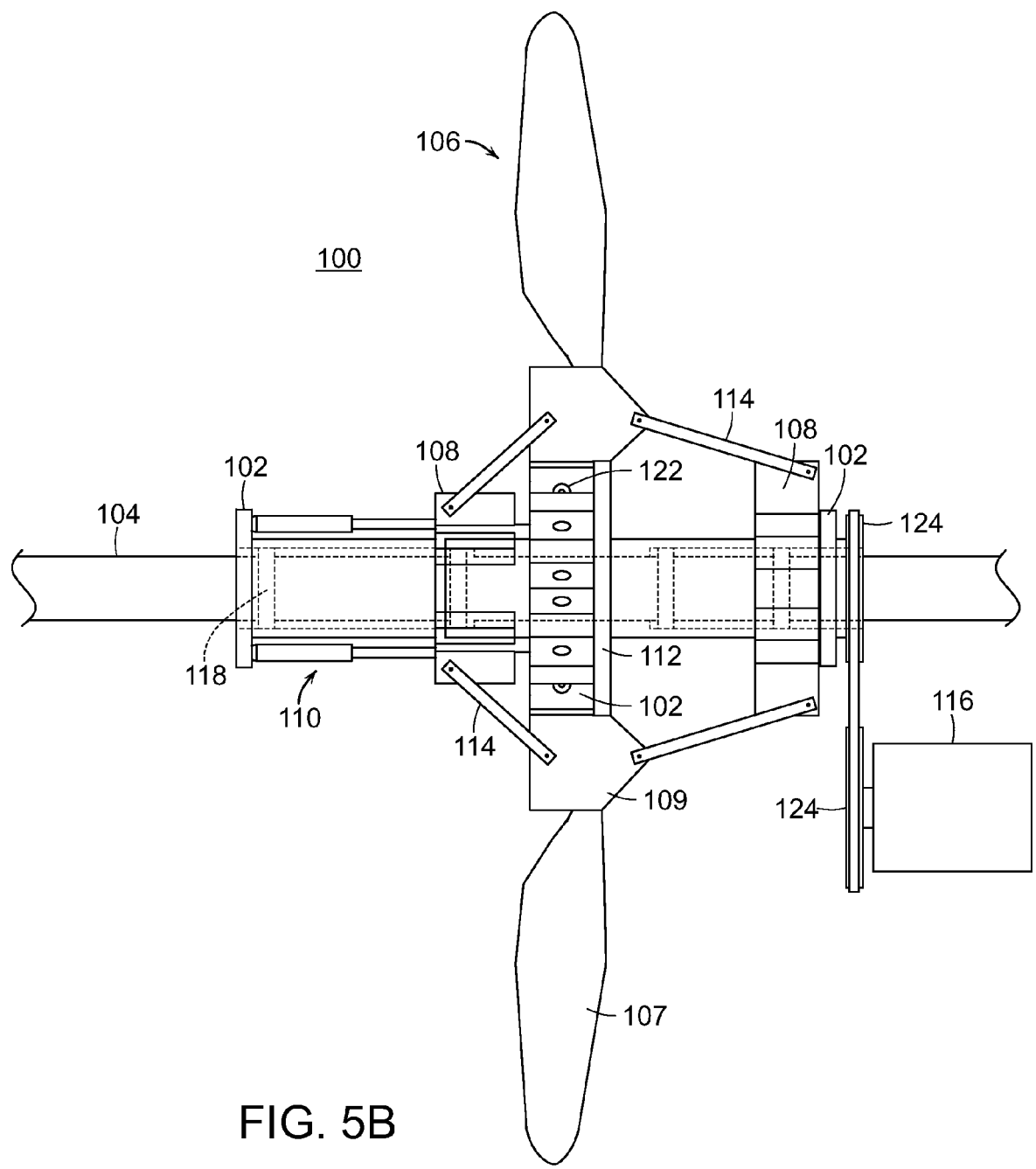
FIG. 5B is another side view of an embodiment of the present invention in an open position with a dual timing hub.

In FIGS. 5A and 5B, there is an embodiment that has two timing hubs 108 with one timing hub 108 located on each side of the blades 106 or central hub 117 along the central hub unit 102. Shown are the shaft member 104, central hub unit 102, blades 106, blade body 107, blade arms 109, fluid buffer unit 110, first arm 111, second arm 113, lock plate 112, timing arms 114, bearings 118, drive mechanism(s) 124, and motor 116.

With timing hubs 108 located both forward and rearward of the central hub 117, in the closed position, one timing hub 108 is positioned away from the central hub 117, while the other timing hub 108 rests against the face of the lock plate 112. As power is applied, via the motor 116 or other mechanical means, and the blades 106 open, one timing hub 108 moves forward towards the central hub 117, and the other timing hub 108 moves forward, away from the central hub unit 102. In the fully open position, one timing hub 108 contacts the rear of the central hub 117, and the other timing hub 108 contacts a stop plate, which may be part of the central hub unit 102, located behind the drive mechanism 124. Of the embodiments described herein, this particular embodiment may have the potential to support the largest size blades 106 since each blade 106 is timed from each side.

Figure 6A:
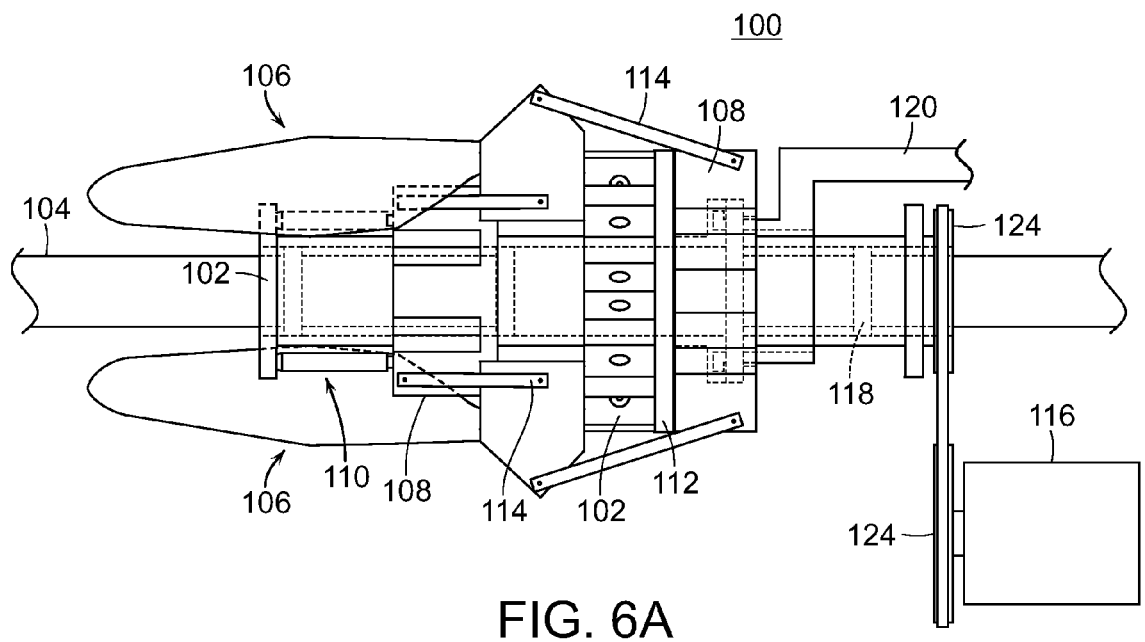
FIG. 6A is a side view of an embodiment of the present invention with an optional manual control mechanism coupled thereto.
Figure 6B:
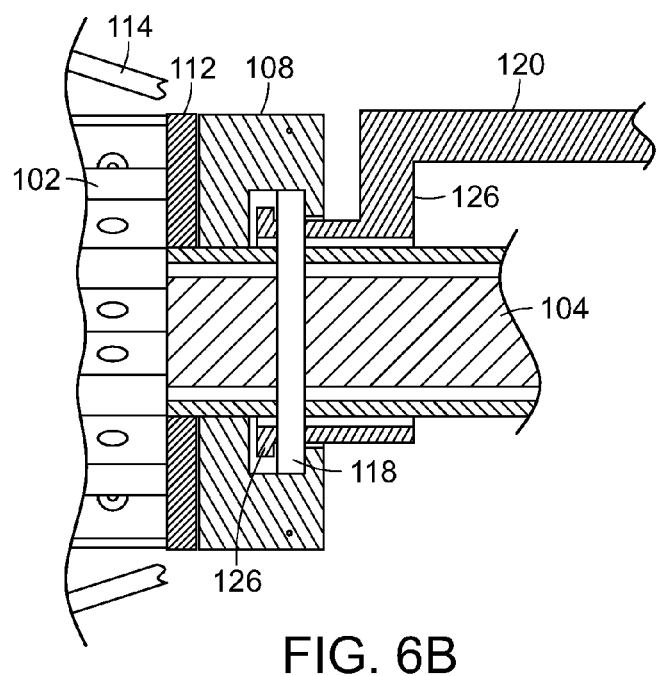
FIG. 6B is an enlarged side view of the optional manual control mechanism.

In FIGS. 6A and 6B, there is yet another embodiment of the present invention. Shown are the shaft member 104, central hub unit 102, blades 106, blade body 107, blade arms 109, fluid buffer unit 110, first arm 111, second arm 113, lock plate 112, timing arms 114, bearings 118, drive mechanism(s) 124, control bar 120, and motor 116. Generally, the embodiment shown in FIG. 6A, resembles the embodiment described in FIGS. 5A-B. However, this particular embodiment further provides for a control bar 120 and at least one additional bearing 118 to selectively control the operation of the collapsible propeller 100.

This mechanism of operation is highlighted in FIG. 6B which is enlarged portion of FIG. 6A. Here, there is at least one additional bearing 118 is placed in a recess within the timing hub 108 positioned in front of the central hub 117. Inside this bearing 118 rides an extension shaft 126, to which a control bar 120 is mounted. This control bar 120 is preferably connected mechanically to a linear actuator, or other mechanical control component, which may draw the bar forward or in another suitable direction. As the control bar 120 moves from its position, the timing hub 108, and subsequently, the blades 106, are moved into the open position similar to that shown in FIG. 5B. When the collapsible propeller 100 is manually moved into the open position, it may function as an air brake, which can be used, in some instances, to correct the course of the aircraft.

Furthermore, as the collapsible propeller 100 is moved into the open position, the force of oncoming air will cause the collapsible propeller 100 to rotate, in a process that is known as "wind milling." This occurs because the collapsible propeller 100 is in an open position, however, it has not been engaged by a motor 116 or other mechanical means to cause rotation of the collapsible propeller 100. Thus, in some instances an electric drive motor or motor 116 may be capable of acting as a generator. This "wind milling" propeller rotation can subsequently be converted into electric current and sent back through the electric power circuit to recharge the on-board batteries or other power storage device(s). This would, in turn, allow the propeller 100 to function as a "regenerative air-brake," much like the regenerative braking systems becoming commonplace in electric/hybrid cars, such as the Toyota Prius or the Tesla Roadster. Essentially, when used in this configuration, any course correction in the flight plan could also be used to provide additional power, further increasing the range of the aircraft.

As described below, the concept of using the collapsible propeller 100 for course correction, may be achieved via this particular or other embodiments. In the embodiments where the timing hub 108 is located in front of the central hub 117, the existing propeller could be modified with the control bar 120 and/or additional bearing 118 to provide the pilot or user with the option of mechanically controlling the opening and closing of the propeller blades, as shown and described.

Figure 7:
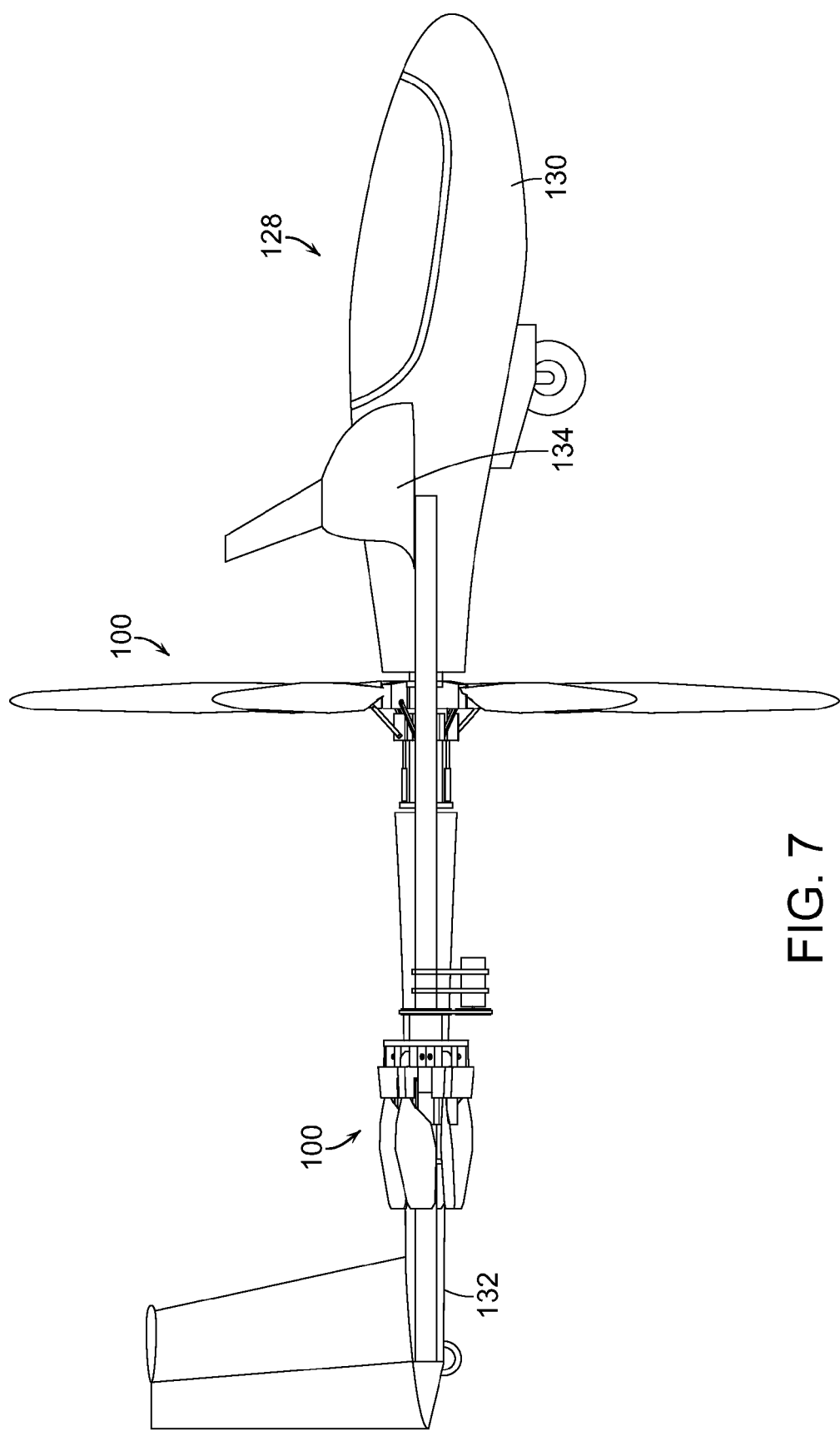
FIG. 7 is a side view of an aerial vehicle employing an embodiment of the present invention.
Figure 8:
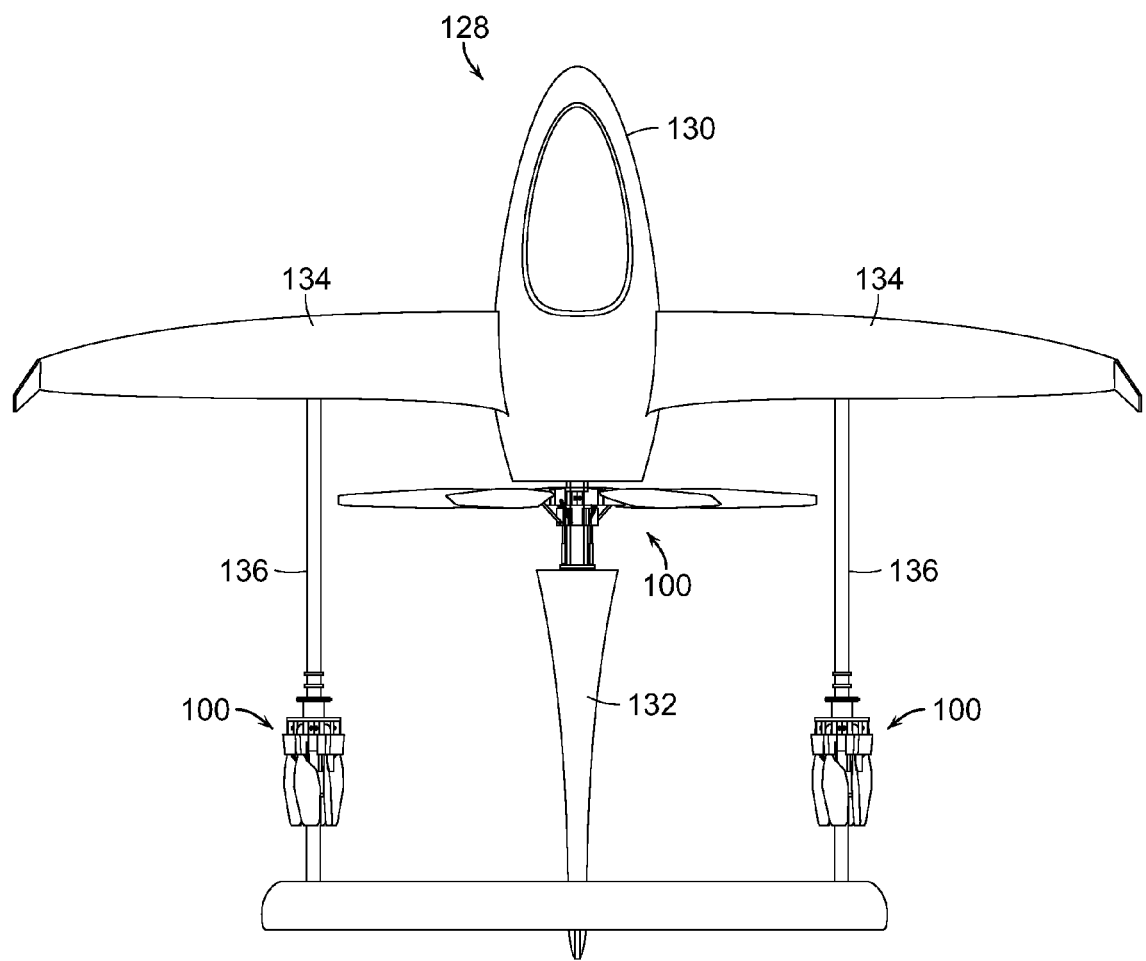
FIG. 8 is a top view of an aerial vehicle employing an embodiment of the present invention in a three propeller configuration, with two of the propellers in a closed position and one in an open position.

In FIGS. 7 and 8, there is a glider 128 exhibiting at least one embodiment of the present invention. The glider 128 generally comprises a body 130, wing(s) 134, and a tail 132. As shown, the glider 128 has multiple collapsible propellers 100 consistent with the present invention disposed thereon. Such a glider 128 may employ at least one collapsible propeller 100 and may have more than one collapsible propeller 100 with each collapsible propeller 100 being a particular size. In the configuration shown, there are two collapsible propellers 100 positioned on a propeller support 136. The collapsible propellers 100 may, however, be mounted in any number of locations and configurations. A central collapsible propeller 100 is also located thereon.

As shown in FIG. 7, the central collapsible propeller 100 is in an open position and is larger than the two smaller collapsible propellers 100 in the propeller supports 136. The two propellers on the supports 136 may be used to provide adequate thrust for taking off, whereas the larger collapsible propeller can be selectively opened once airborne, since the proper ground clearance may not be present when the craft is on the ground. Alternatively, all collapsible propellers 100 could be used simultaneously. The glider 128 shown is for exemplary purposes only and the exact specifications and configurations may deviate depending on the desired usage of embodiments of the present invention. Further explanation of uses of the propellers will be explained generally herein below.

Figure 9A:
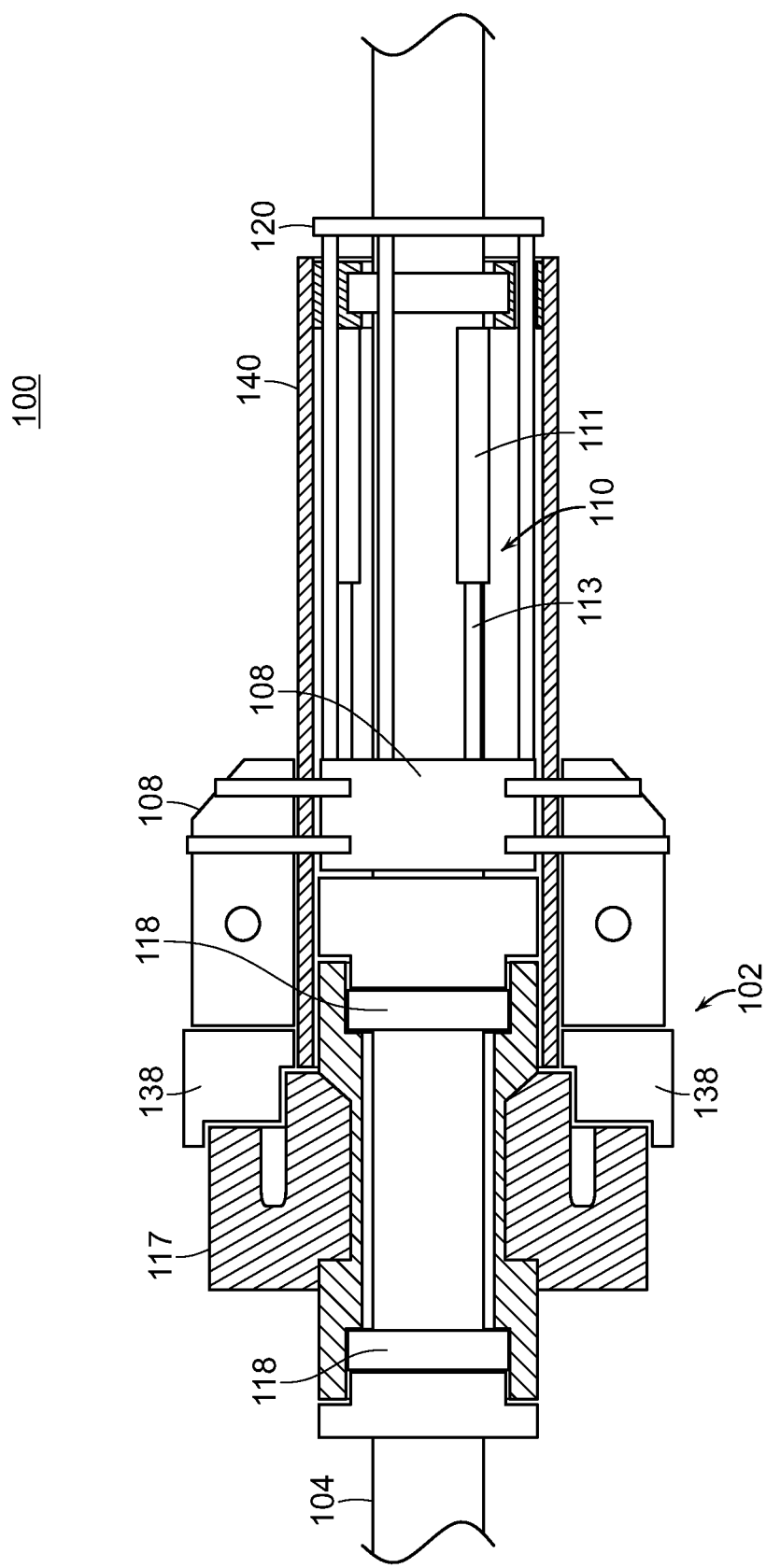
FIG. 9A is a side view of an embodiment of the present invention in a closed position.
Figure 9B:
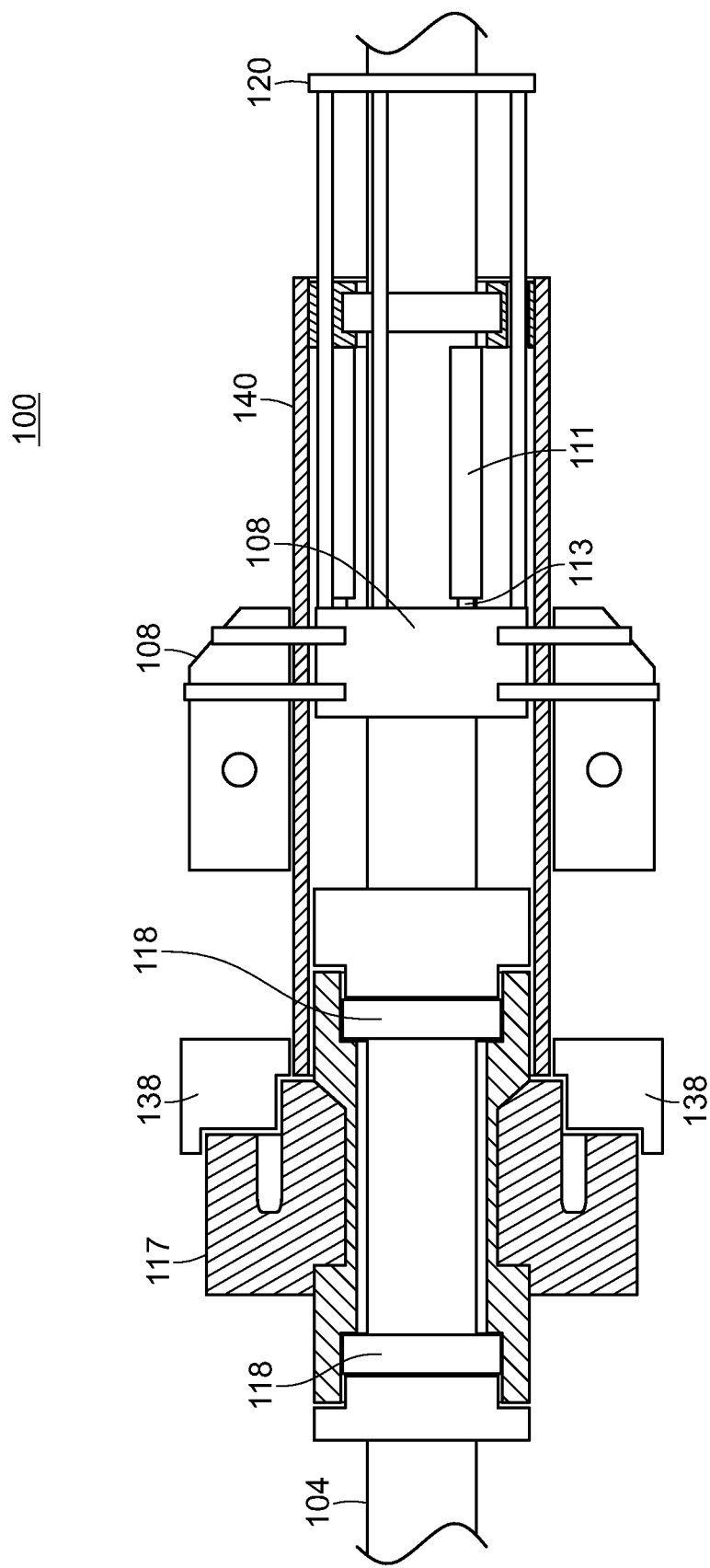
FIG. 9B is a side view of an embodiment of the present invention in an open position.

Referring now to FIGS. 9A and 9B, there is another embodiment of the present invention in a closed/open configuration, respectively. The blades and timing arms have been removed for clarity purposes only.

The main component of this propeller 100 is still the central hub unit 102, composed of central hub 117 and lock plate 138. This central hub unit 102 differs, however, from the other embodiments in that the bearings 118 it rides on are preferably installed into pockets or recesses milled directly into each end of the central hub 117. The bearings 118 are then held in place within these individual bearing retaining plates.

This configuration may support a number of blades (not shown) located circularly around this central hub unit 102. In a preferred embodiment, the blades may be spaced evenly at about 60 degree intervals. Each blade consists of at least a blade arm and blade surface. The blade arm runs nearly the length of the blade surface, and serves as a backbone or foundation, thereby increasing the structural integrity of each blade. Each blade is slid into an individual slot on the central hub 117, from the front. As the blade is brought into position in the central hub unit 102, it drops into a pocket. Halfway between the lower surface of this pocket and the outer surface of the central hub unit 102 itself, there is an additional slot, which may be cut perpendicular to the blade's length. This slot is intended to accept a blade mounting bolt, which runs through the pivot point of each blade.

Once the blades are installed in their individual slots on the central hub 117, the central hub cover/lock plate 138 is installed over the top of the central hub 117. This central hub cover 138 serves the purpose of keeping each blade mounted inside the central hub unit 102, as well as limiting the forward movement of each blade as it transitions into the open position or configuration, serving as a "lock plate." There may also be separate slots cut for each blade arm, each with several points of contact to evenly disperse the load generated by the forward movement and pressure of each blade as it enters the open position or configuration.

Once the central hub cover 138 and blades are installed in the central hub unit 102, a second timing hub 108 is installed. This timing hub 108 rides on a timing hub travel tube 140, which is secured to the front of the central hub unit 102. Inside the timing hub travel tube 140, there is an inner ring, which may be connected to the timing hub 108 via bolts or other appropriate securement mechanism, through slots cut into the surface of the timing hub travel tube 140. Each slot terminates at the open position of the timing hub 108, which may eliminate the need for a stop-plate or lock plate to limit any potential forward movement of the timing hub 108, as the bolts will contact the end of each slot.

At a front face of this timing hub travel tube 140, there may be a third bearing, which sits in a bearing retainer or recess which is bolted to the timing hub travel tube 140. Aside from maintaining a linear path of motion for the timing hub 108 as it moves forward or rearward via the bolts positioned through the slots, the inner ring also serves as a mounting point for the hydraulic cylinders 110 (composed of 113 and 111), and control bars.

Each hydraulic cylinder 110 may also connected to the forward bearing retainer. Each control bar passes through the bearing retainer, where they are attached to a separate control plate 120, which can be used to manually open the propeller blades without applying power As the timing hub 108 is moved into the open position, each hydraulic cylinder 110 is compressed, and the control bars/plate 120 are allowed to extend through the forward bearing retainer, where they can be manipulated by an external mechanical control, should unpowered opening of the propeller be desired. Once the timing/control assembly is installed on the central hub unit 102, each blade is then connected to the timing hub 108 via individual blade timing arms. These arms allow each blade to operate identically to all the other blades, maintaining smooth, uneventful opening or closing of the propeller 100, with no risk of interference among blades.

A drive gear, may be further required for operation of the propeller 100, which may be mounted to the forward area of the timing hub travel tube 140, in front of the timing slots. Once power is supplied to the drive motor or engine is being used to power the propeller 100, the entire propeller assembly will begin to rotate.

Initially, centrifugal force will cause each blade arm to slightly move away from its resting position, at which point each blade will begin to produce thrust. As the rotational speed increases, thrust also increases, which allows each blade to generate sufficient thrust to overcome the pressure exerted by the hydraulic cylinders 110, at which point the timing hub 108 will move forward towards its open position. As the blades and timing hub 108 enter their open position, they will encounter both the lock plate 138 and the end of each timing hub tube slot, respectively.

The blades will remain in this position until power is removed from the propeller 100, at which point they will return to their closed positions. While entering either the open or closed positions, their rate of position change will be controlled by the hydraulic buffer cylinders 110, reducing the chance of damage caused by rapid opening or closing. If control bars are installed, they will also change position as well. Additionally, if control bars are installed, the propeller 100 can be forced into the open position manually, while the propeller is unpowered, similar in design to previous prototypes. If this occurs while the plane the propeller is installed on is moving forward, the propeller 100 will begin to "windmill," while acting as an air-brake. This rotational movement can be used to spin an electric generator, effectively turning the propeller into a "regenerative air-brake."

The collapsible propeller described in FIGS. 1-8 is intended, in at least one embodiment, to be used selectively as needed in operation of a human powered or mechanically (engine) powered aerial vehicle, however, other applications are equally as applicable. For example, many of the larger turbine engines present on many commercial and military jets are primed via a smaller turbine. This "priming" turbine is typically mounted on wheels on the ground and is referred to as a "start cart" or air start unit (ASU). This unit provides high pressure air to assist in starting the turbine. These units are very heavy and thus relegated to ground use only, and cannot assist once the aircraft is airborne.

In some instances, a turbine can be shut down in flight after suffering a "flame out," a loss of a sufficient fuel supply, or intentionally by the crew to save fuel. One proper methodology of restarting the turbine is to dive the aircraft using the airspeed of the craft to windmill the compressor and then supplying fuel and ignition to the turbine. However, the inclusion of an embodiment of the present invention into an air intake, may be able to be activated in such an event thereby priming the turbine without having to resort to diving the aircraft. Once the turbine has been primed by the present invention, the present invention is then collapsed and the aircraft continues on its travels. The lightweight and overall portability of the present invention enable this inflight usage over traditional ground priming methods employed today.

Alternatively, the present invention and its embodiments can also be used as the main propulsion system rather than an auxiliary priming system. While the collapsible propeller 100 is non-powered and the aircraft or aerial vehicle to which it is coupled is not airborne or otherwise being propelled, the collapsible propeller 100 can rest in the closed position, the open position, or in an alternative position therebetween, so long as the fluid buffer unit(s) 110 is neutrally charged (i.e. not pressurized to naturally move in one direction or the other). This is a preferred design variation, as the pressure of the fluid buffer unit 110 does not need to be overcome by the thrust generated by the collapsible propeller 100 while under power, or the drag created by the collapsible propeller 100 when not powered, in order to expand or collapse the blades 106.

If the fluid buffer unit 110 is pressurized, the blades 106 can be kept closed while at rest, however, this force will need to be overcome by the thrust generated by the collapsible propeller when it is powered, slightly reducing overall system efficiency. While the collapsible propeller 100 is non-powered and the aircraft is airborne, the blades 106 are held in the closed position by the force of oncoming air, and/or the fluid buffer unit 110, if it is indeed pressurized.

As power is applied to the collapsible propeller 100, via human powered or other mechanical means, it will begin to rotate about the shaft member 104. Initially, centrifugal force will cause the non-fixed end of each blade 106 to pivot or rotate away from its closed location, which may be substantially parallel to the shaft member 104. At this point, each blade 106 will begin generating thrust to further move each blade 106 away from its closed location. As each blade 106 begins to pivot from its closed location, the timing hub 108, coupled to the blades 106 via individual blade timing arms 114, will begin to move forward (or backwards or both forwards and backwards depending on location and embodiment) towards the central hub 117.

The timing hub 108 will keep the rate at which each blade 106 pivots uniform in relation to the others throughout its travel, preventing potential interference among the blades 106, and limiting or eliminating any potential vibrational issues that may occur as a result of loss of balance by having one blade move at a different rate than the others.

As the timing hub 108 moves forward, it will apply force to the fluid buffer unit 110. The fluid buffer unit(s) 110 will keep the rate at which the timing hub 108 moves along the central hub unit 102 controlled, subsequently allowing the blades 106 to pivot towards their open position in said controlled fashion, thereby reducing the chances of potential damage to the airframe or collapsible propeller 100 by having the blades 106 forced into their open position at a high rate of speed. So long as sufficient power is supplied to the collapsible propeller 100 to generate enough thrust to overcome the forces of drag due to oncoming air, and centrifugal force upon the propeller blades themselves, it will remain in the open position.

Once power to the collapsible propeller is reduced or removed, the force of drag due to oncoming air will begin to push the blades 106 rearward. Each blade 106 will begin to pivot at the point on the central hub 117 to which it is fixed. As each blade 106 pivots, it will apply force to the timing hub 108 via the individual blade timing arms 114, and the timing hub 108 will begin to move rearward (or forwards or both depending on location and embodiment). Once again, the fluid buffer units 110 will control the rate of movement, to prevent damage to the collapsible propeller 100 or airframe by having the blades 106 enter their closed position at a high rate of speed. At this point, the collapsible propeller 100 will remain in the closed position, creating very little drag, until power is once again applied. Regardless of blade number, size, or timing hub position, the basic operating principles of the collapsible propeller 100 will not change.

While this collapsible propeller design is capable of being driven by any power source able to be translated into rotational force, it is preferentially suited for pairing with an electric motor, the power for which can be stored in on-board battery banks, or generated by an internal combustion engine to create a series electric hybrid style drive. Driving the collapsible propeller with an electric motor would enable rapid start/stop sequences or pulses, such that power is only consumed when thrust is needed and the collapsible propeller is engaged, thereby allowing the collapsible propeller to quickly return to the closed position, reducing drag as much as possible.

At least one applicable field of use that may benefit from this collapsible propeller is in the design and creation of unmanned aerial vehicles (UAVs). An exemplary design in this case would be a small, lightweight craft, which would be powered by at least one collapsible propeller. The UAV would take off and climb to a cruising altitude, where power would be removed from the collapsible propeller. The collapsible propeller would collapse into the closed position, thus eliminating as much drag as possible, and the UAV would glide until it falls to a lower altitude. The collapsible propeller would then be powered again, bringing the UAV up to the initial cruising altitude. This "rise and fall" cycle would be performed repeatedly, in order to maximize potential flight time of the craft in relation to available power supplies. To further increase the range of the UAV, the surface of the airfoil or wings of the craft may be covered with solar cells or other energy harvesting means, which would provide additional power to the on-board battery bank.

In some configurations, any number of collapsible propellers may be used. Thus, multiple collapsible propellers may be used on takeoff, and the UAV would follow the same "rise and fall" flight cycle as detailed above. In this case, however, corrections in flight course can be accomplished by providing power to the collapsible propeller opposite the path of correction, or, if the aircraft is currently engaged in ascent, by reducing or removing power to the collapsible propeller on the same side as the desired correction. This enables directional turning of UAV to the right by simply closing the right collapsible propeller and simply power the left collapsible propeller. However, in other instances, both collapsible propellers remain powered and one may simply reduce or remove power to the left or right or other collapsible propeller to provide for the proper course correction.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A mechanically self-regulating propeller comprising:
   a central hub unit coupled to a shaft member such that rotation of the shaft member causes rotation of the central hub unit;
   a circular, planar lock plate coupled to a surface of the central hub unit;
   a plurality of blades hingeably coupled to the central hub unit,
      wherein each of the plurality of blades comprise a blade body and a blade arm, and
      wherein each of the plurality of blades, when in an open position, abut the circular, planar lock plate;
   at least one timing hub being coupled to each of the plurality of blades,
      wherein the at least one timing hub is slidably engaged to the shaft member, and
      wherein each of the plurality of blades is coupled to the at least one timing hub via at least one timing arm; and
   at least one fluid buffer unit coupled to the at least one timing hub.

2. The propeller of claim 1 wherein the plurality of blades are capable of being positioned in an open and a closed position.

3. The propeller of claim 2 wherein the closed position is when the plurality of blades are substantially parallel to the shaft member.

4. The propeller of claim 2 wherein the open position is when the plurality of blades are substantially perpendicular to the shaft member.

5. The propeller of claim 1 further comprising a motor operably coupled to the shaft member.

6. The propeller of claim 1 wherein there are eight blades disposed around the central hub unit.

7. The propeller of claim 1 further comprising at least two bearings.

8. The propeller of claim 7 wherein the at least two bearings are positioned around the shaft member.

9. The propeller of claim 8 wherein the at least two bearings facilitate rotation of the plurality of blades.

10. The propeller of claim 1 wherein the at least one fluid buffer unit is further coupled to the central hub unit.

11. A mechanically self-regulating propeller comprising:
    a central hub unit coupled to a shaft member such that rotation of the shaft member causes rotation of the central hub unit;
    a circular, planar lock plate coupled to one surface of the central hub unit;
    a plurality of blades hingeably coupled to the central hub unit,
       wherein each of the plurality of blades comprise a blade body and a blade arm, and
       wherein the plurality of blades are capable of being positioned in at least an open and a closed position,
          wherein when in the open position, the blade body of the plurality of blades abuts the circular, planar lock plate;
    a timing hub coupled to the plurality of blades,
       wherein the timing hub is slidably engaged to the shaft member, and
       wherein each of the plurality of blades is coupled to the timing hub via at least one timing arm; and
    at least two fluid buffer units with each of the at least two fluid buffer units coupled to the at least one timing hub and the central hub unit.

12. The propeller of claim 11 further comprising a lever coupled to the central hub unit.

13. The propeller of claim 11 wherein the at least two fluid buffer units are pressurized hydraulic cylinders.

14. The propeller of claim 11 further comprising a timing hub travel tube coupled to a front surface of the central hub unit.

15. The propeller of claim 14 wherein the timing hub travel tube has a plurality of slots extending along a length thereof.

* * * * *